United States Patent [19]

Honda et al.

[11] Patent Number: 4,541,050
[45] Date of Patent: Sep. 10, 1985

[54] CONTROL DEVICE FOR A VEHICLE

[75] Inventors: Masakazu Honda, Kariya; Susumu Harada, Okazaki; Akio Kobayashi, Kariya, all of Japan

[73] Assignee: Nippondenso Co., Ltd., Kariya, Japan

[21] Appl. No.: 682,476

[22] Filed: Dec. 17, 1984

Related U.S. Application Data

[63] Continuation of Ser. No. 358,786, Mar. 16, 1982, abandoned.

[30] Foreign Application Priority Data

Mar. 20, 1981 [JP] Japan .................................. 56-41097

[51] Int. Cl.³ .............................................. G06F 11/30
[52] U.S. Cl. ................................ 364/424; 364/431.11; 371/16; 371/62
[58] Field of Search ............... 364/424, 431.04, 431.11, 364/200, 900; 371/8–11, 16, 60, 61, 62

[56] References Cited

U.S. PATENT DOCUMENTS

| | | | |
|---|---|---|---|
| 4,200,224 | 4/1980 | Flint ........................................ | 371/16 |
| 4,282,574 | 8/1981 | Yoshida et al. ................. | 364/431.11 |
| 4,304,003 | 12/1981 | Kakizawa et al. ..................... | 371/62 |
| 4,317,167 | 2/1982 | Hartig et al. ............................ | 371/62 |
| 4,339,801 | 7/1982 | Hosaka et al. ................. | 364/431.04 |
| 4,350,225 | 9/1982 | Sakata et al. ............................ | 371/9 |
| 4,386,427 | 5/1983 | Hosaka ........................... | 364/431.11 |
| 4,405,982 | 9/1983 | Ruhnau et al. ...................... | 371/62 |
| 4,410,938 | 10/1983 | Higashiyama .................. | 364/431.11 |

Primary Examiner—Gary Chin
Attorney, Agent, or Firm—Cushman, Darby & Cushman

[57] ABSTRACT

A control device for vehicles includes a microcomputer having an output port which outputs a signal in a normal operating state of the microcomputer, and two electronic circuits associated with the microcomputer. The two electronic circuits operate to change a control mode for the vehicle to a fallback mode upon occurrence of a malfunction or misoperation in the microcomputer thereby to prevent the vehicle from operating in a dangerous running condition caused by erroneous control due to the misoperation by the microcomputer.

6 Claims, 2 Drawing Figures

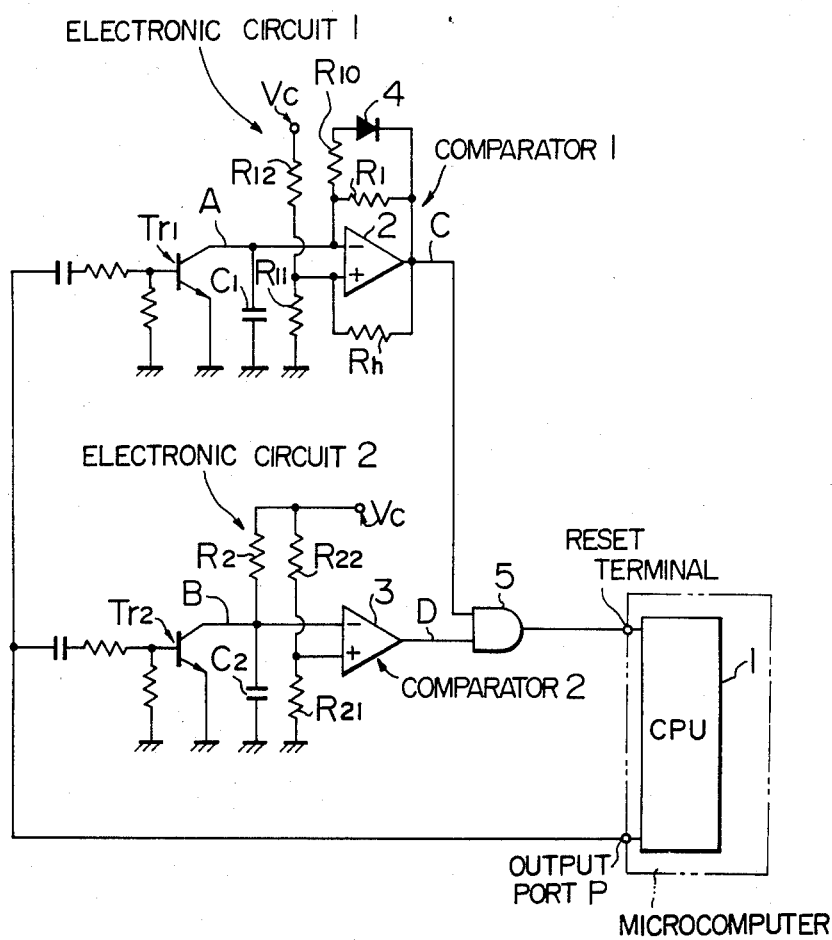
FIG. I

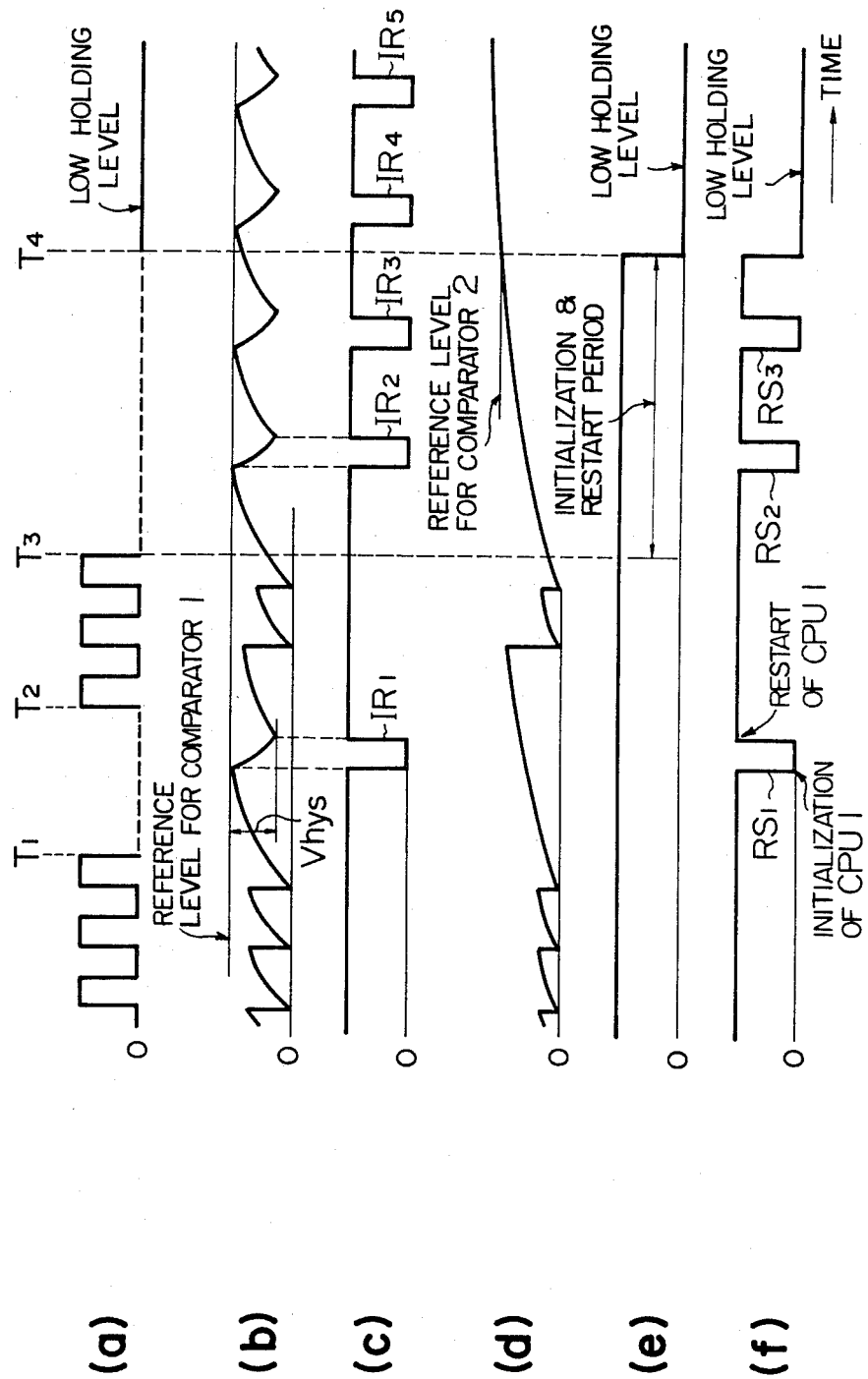

CONTROL DEVICE FOR A VEHICLE

This is a continuation, of application Ser. No. 358,786, filed Mar. 16, 1982, now abandoned.

BACKGROUND OF THE INVENTION

1. Field of the Invention

The present invention relates to a control device for vehicles using a microcomputer in which, upon occurrence of any malfunction or misoperation of the microcomputer, the control mode is fixed to a fallback mode to avert any erroneous control and prevent the vehicle from falling into a dangerous running condition and thereby to avert danger.

2. Description of the Prior Art

While a microcomputer (hereinafter referred to simply as a CPU) has come into use in various control systems for vehicles, if the CPU fails to operate properly, particularly, if the CPU used in an automotive engine control system malfunctions or misoperates, not only proper control of the engine is lost to cause a bad effect on the engine, but also there arises a case where the vehicle falls into a dangerous running condition. A conventional control system is equipped with a CPU which generates a predetermined on-off signal to be used for the purpose of detecting a malfunction occurring in or misoperation by the CPU and, upon detection of the malfunction of or misoperation by the CPU, generates a reset signal to effect the initialization and restart of the CPU, thereby making it possible to monitor the operation of the control system.

However, if a failure occurs in the hardware of the CPU or the above-described method fails, for some reason, to cause the initialization and restart of the CPU, thereby failing to restore a normal operation of the CPU, the vehicle is still left in a dangerous condition.

The present invention has been made with a view to overcoming the foregoing drawback of the prior art safety device.

SUMMARY OF THE INVENTION

It is an object of this invention to provide an improved control device for vehicles using a CPU comprising an electronic circuit which operates to maintain a reset terminal of the CPU in a reset condition when the CPU malfunctions or misoperates, thereby holding the level of an output port of the CPU at a predetermined level, namely, which operates to maintain a control circuit connected to the output port of the CPU in a suitable condition thereby to change the control mode to a fallback mode and maintain it there, thereby averting any dangerous condition.

It is another object of this invention to provide a control device for vehicles using a CPU comprising a unit to be used in combination with the initialization and restarting unit of the above-mentioned prior art control system whereby the control mode is changed to the fallback mode when it is impossible to restore the CPU to a normal operating condition only by the initialization and restarting unit.

BRIEF DESCRIPTION OF THE DRAWINGS

FIG. 1 is a circuit diagram showing an embodiment of this invention.

FIG. 2 is a waveform diagram showing a plurality of signal waveforms appearing at principal points in the electronic circuits shown in FIG. 1 when they are in operation.

DESCRIPTION OF THE PREFERRED EMBODIMENTS

Preferred embodiments of this invention will now be described with reference to the accompanying drawings.

In FIG. 1, numeral 1 designates a CPU of a microcomputer in a control system for vehicles. In the embodiment shown in FIG. 1, it is assumed that the CPU 1 is reset when a low level reset signal is applied to its reset terminal and that the initial levels of input and output ports of the CPU 1 are maintained at a low level in its reset condition. When the CPU 1 is operating properly, the output port P of the CPU 1 outputs a pulse signal which alternates between high and low predetermined levels as illustrated at the left part of the waveform shown at (a) of FIG. 2.

In FIG. 1, an electronic circuit 1 shows a first initializing and restarting electronic circuit, and an electronic circuit 2 shows a second electronic circuit proposed by the present invention.

Basically, an input section of each of the electronic circuits 1 and 2 has a charging and discharging circuit comprising a capacitor, a resistor and a transistor. When the CPU 1 is processing properly, a pulse signal having the waveform shown at (a) of FIG. 2 is generated from the output port P as mentioned above. In the electronic circuits 1 and 2, positive-going leading edges of the pulse signal turn on transistors $Tr_1$ and $Tr_2$ and cause capacitors $C_1$ and $C_2$ to discharge as shown at (b) and (d) of FIG. 2 which respectively show the waveform at a point A and the waveform at a point B in FIG. 1. The transistors $Tr_1$ and $Tr_2$ are turned off at the remaining portions of the waveform of the pulse signal from the output port P, and thus the capacitors $C_1$ and $C_2$ are charged with time constants $C_1R_1$ and $C_2R_2$, respectively.

Assuming now that the CPU 1 begins to malfunction misoperate for some reason at times $T_1$ and $T_3$ shown at (a) of FIG. 2, so that the output signal from the output port P of the CPU 1 disappears during a time period from $T_1$ to $T_2$ and that from $T_3$ to $T_4$, respectively. Then, the transistors $Tr_1$ and $Tr_2$ stay in the nonconductive state and thus the capacitors $C_1$ and $C_2$ stop discharging through the transistors $Tr_1$ and $Tr_2$ with the result that the potentials of non-grounded terminals of the capacitors $C_1$ and $C_2$ rise continuously with the time constants $C_1R_1$ and $C_2C_2$, respectively.

In the electronic circuit 1, an operational amplifier 2, resistors $R_h$, $R_1$ and $R_{10}$ and a diode 4 constitute a comparator 1. When the potential at the non-grounded terminal of the capacitor $C_1$ rises to exceed a comparison input voltage level of the comparator 1 which is determined by voltage dividing resistors $R_{11}$ and $R_{12}$, the electronic circuit 1 starts oscillating. In (b) of FIG. 2, the waveforms appearing during the time periods from $T_1$ to $T_2$ and on and after $T_3$ show the oscillation waveforms of the potential at the point A on the non-grounded terminal side of the capacitor 1 when the electronic circuit 1 is oscillating, which waveforms rise with the time constant $C_1R_1$ and fall with a time constant which is determined by the values of the elements $C_1$, $R_1$ and $R_{10}$. The waveforms $IR_1$ and $IR_2$ to $IR_5$ shown at (c) of FIG. 2 to appear during the above-mentioned time periods are output pulse waveforms (initializing and restarting signals) appearing at an output point C of the electronic circuit 1 during its oscillating operation. A time interval between the time of stopping the delivery of the signal from the output port P of the CPU 1 and the time when the electronic circuit 1 starts oscillating is determined by the values of the capacitor $C_1$, the resistor $R_1$ and the voltage dividing resistors $R_{11}$ and $R_{12}$. In the above-described oscillation period of the electronic circuit 1, the slopes of the charge and discharge waveforms of the capacitor $C_1$ during the charging and discharging periods vary with the values of the capacitor $C_1$ and the resistors $R_1$ and $R_{10}$, and the amplitude Vhys of the oscillation waveform of the potential of the point A on the non-grounded terminal side of the capacitor $C_1$ is determined by the value of the resistor $R_h$.

In the electronic circuit 2, a comparator 2 comprising an operational amplifier 3 compares the potential of the point B on the non-grounded terminal side of the capacitor $C_2$ which continues to rise with the time constant $C_2R_2$ from the time of stopping the delivery of the signal from the output port P of the CPU 1, as shown in (d) of FIG. 2, with the comparison input voltage level of the comparator 2 which is determined by the values of voltage dividing resistors $R_{21}$ and $R_{22}$. Thus, until the potential of the point B reaches the comparison input voltage level, the output level at an output point D of the comparator 2 is maintained at a high level as shown at (e) of FIG. 2 showing the waveform at the point D, and the output level at the output point D is made to be a low level when the former level exceeds the latter level.

Then, the output signals of the electronic circuits 1 and 2 are applied to the input terminals of an AND circuit 5 so that the AND circuit 5 outputs a logical product of the two signals, and then the logical product output is applied to the reset terminal of the CPU 1 as reset signals $RS_1$ to $RS_3$ indicated at (f) of FIG. 2 which shows the reset input waveform to the CPU 1. When the output of the electronic circuit 2 is at a high level, the output signal of the electronic circuit 1 passes through the AND circuit 5 and is applied to the reset terminal of the CPU 1. The CPU 1 is initialized when the level of this reset signal turns low, and the CPU 1 is restarted when the level of this reset signal turns high.

When the CPU 1 starts again processing properly so that an output signal is generated at the output port P, as mentioned before, the positive-going leading edges of the output signal cause the capacitors $C_1$ and $C_2$ to discharge through the transistors $Tr_1$ and $Tr_2$, respectively, and the electronic circuits 1 and 2 are restored to the respective initial states changing the level of their output points C and D to a high level. Thus, the AND gate 5 supplies a high level signal to the reset terminal of the CPU 1 thereby to maintain the CPU 1 in the state of restart.

In the event that the CPU is not restored to the normal operating state for some reason upon the initializing and restarting operations by the supply of the initializing and restarting signals from the electronic circuit 1, the electronic circuit 2 according to this invention becomes effective. To provide for such a situation, the values of the capacitor $C_2$ and the resistors $R_2$, $R_{21}$ and $R_{22}$ are preselected so that the electronic circuit 2 becomes operative only after a predetermined number of initializing and restarting signals comprising $IR_2$ and others (such as $IR_3$, $IR_4$ and $IR_5$) are generated by the electronic circuit 1 as shown at (c) of FIG. 2. As a result, once the generation of the output signal from the output port P of the CPU 1 stops, so long as the CPU 1 is not restored to its normal operating state, thus failing to generate an output signal from its output port P, even after the generation of the initializing and restarting signals $IR_2$ to $IR_5$ of predetermined times (two times in the case shown at (f) of FIG. 2), the potential of the output point D of the electronic circuit 2 is maintained at a low level so that the signal supplied from the output terminal of the AND circuit 5 to the reset terminal of the CPU 1 is also maintained at a low level, thereby maintaining the CPU 1 in the initial state and also holding the respective levels of its input and output ports at a low level. Since the output port of the CPU 1 is usually connected to a control circuit for driving an actuator, etc. in a control system, it is possible to select the fallback mode by maintaining each of the levels of the input and output ports of the CPU 1 at a fixed level by using the electronic circuit according to this invention, or by the use of some additional electronic circuits so as to maintain each of the levels of the input and output ports at a desired value.

While, in the embodiment described above, the conventional initializing and restarting electronic circuit 1 is combined with the electronic circuit 2 which provides the featured functional effect of this invention, the electronic circuit 2 according to this invention may be used solely. In this case, irrespective of the occurrence of any mode of malfunction of or misoperation in the CPU 1, the CPU 1 is unconditionally changed to the fallback mode upon the lapse of a predetermined time from the time of stopping the delivery of an output signal from the output port P of the CPU 1.

Further, in the embodiment of this invention shown in FIG. 1, an open-collector output type transistor may be used as an output stage transistor in each of the comparators 1 and 2 and the AND circuit 5 connected to the outputs of the electronic circuits 1 and 2 may be replaced by the circuit structure of the connection of a wired-OR circuit.

Further, as a second embodiment of this invention, the electronic circuit 2, which provides the featured functional effect of this invention, may be formed by using a counter for counting the number of the initializing and restarting pulse signals from the electronic circuit 1 shown at (c) of FIG. 2 and an electronic circuit which operates to hold its output signal in a predetermined state when the count of the counter reaches a predetermined value.

The safety device for vehicles according to this invention has the following remarkable advantages.

Firstly, in accordance with the electronic circuitry of the safety device of this invention, when any failure occurs in the CPU 1 or when it becomes impossible to effect the initialization and restart of the CPU 1 so that the CPU 1 cannot restore its normal operation, its input and output ports can be initialized and maintained in a constant state or some electronic circuits may be added to hold the input and output ports in a suitable state, thereby holding an external control circuit connected to the output port in a constant state and changing the control mode to the fallback mode.

In particular, where a fallback occurs in the CPU making it impossible to restore the normal operation of the CPU, only with a conventional initializing and restarting electronic circuit, it is impossible to ensure safety control. In such a case, the control device for vehicles according to this invention can function effectively and satisfactorily.

We claim:

1. A control device for a vehicle, comprising:
microcomputer means, having an output port, for outputting a signal in a normal operating state of said microcomputer means;
means for detecting misoperation of said microcomputer means by monitoring said output signal from said output port of said microcomputer means; and
means for controlling said microcomputer means to effect initialization and restart of said microcomputer means whenever said misoperation is detected and to effect a disabling operation of said microcomputer means for avoiding erroneous control of said vehicle due to said misoperation of said microcomputer means whenever the duration of said misoperation exceeds a predetermined time period without successful restart of said microcomputer means.

2. A control device according to claim 1, wherein:
said microcomputer means has a reset terminal; and
said controlling means comprises comparator circuit means, responsive to a detection signal voltage from said detecting means and a reference voltage, for comparing said voltages and for supplying a disabling operation signal to said reset terminal of said microcomputer means whenever said detection signal voltage exceeds said reference voltage.

3. A control device for a vehicle, comprising:
microcomputer means having a reset terminal and an output port for outputting a signal indicative of a normal operating state of said microcomputer means;
first electronic circuit means for receiving said output signal of said microcomputer means, detecting misoperation of said microcomputer means and producing a first detection output signal indicative thereof, said first circuit means including an oscillator circuit means for producing an oscillation output signal in response to said first detection output signal;
second electronic circuit means for receiving said output signal of said microcomputer means, detecting said misoperation of said microcomputer means and producing a second detection output signal indicative thereof, said second circuit means including comparator circuit means for comparing said second detection output signal with a reference voltage and producing a comparison output signal indicative thereof; and
an AND circuit means, responsive to said oscillation output signal of said first electronic circuit means and said comparison output signal of said second electronic circuit means, for outputting to said reset terminal of said microcomputer means a disabling operation signal whenever the duration of said misoperation exceeds a predetermined time period without successful restart of said microcomputer means, whereby the erroneous control of said vehicle is avoided.

4. A control device for a vehicle, comprising:
microcomputer means, having a reset terminal and an output port, for outputting a pulse signal when said microcomputer means is in a normal operating state, and for outputting a signal of a predetermined constant level when said microcomputer means misoperates;
first electronic circuit means, including a first detecting circuit means for receiving said output signal from said microcomputer means, for detecting a misoperation of said microcomputer means and producing a first detection output signal indicative thereof, said first circuit means further including a charging and discharging circuit means for producing a charging and discharging output signal controlled by said first detecting circuit means;
second electronic circuit means, including a second detecting circuit means for receiving said output signal from said microcomputer means, for detecting misoperation of said microcomputer means and producing a second detection output signal indicative thereof, said second circuit means further including comparator circuit means for comparing said second detection output signal with a reference voltage and for producing a comparison output signal indicative thereof; and
an AND circuit means, responsive to said charging and discharging output signal of said first electronic circuit means and said comparison output signal of said second electronic circuit means, for supplying a disabling operation signal to said reset terminal of said microcomputer means whenever the duration of said misoperation exceeds a predetermined time period without successful restart of said microcomputer means, whereby the erroneous control of said vehicle is avoided.

5. A control device for a vehicle, comprising:
microcomputer means having a reset terminal and an output port for outputting a signal in a normal operating state of said microcomputer means;
restart means for receiving said output signal of said microcomputer means, for detecting misoperation of said microcomputer means, producing initializing and restarting signals upon detection of said misoperation of said microcomputer means and applying said initializing and restarting signals to said reset terminal of said microcomputer means to effect initialization and restart thereof after misoperation;
decision means for receiving said output signal of said microcomputer means, detecting misoperation of said microcomputer means, receiving said initializing and restarting signals from said restart means, and determining and outputting a signal indicating that initialization and restart of said microcomputer means have not occurred within a predetermined time from said detection of misoperation of said microcomputer means; and
means for receiving said output signal of said decision means and for producing a control signal for holding said microcomputer means in a disabling mode whenever said decision means output signal is present, whereby the erroneous control of said vehicle is avoided.

6. A control device for a vehicle, comprising:
microcomputer means, having a reset terminal, for outputting at an output port a pulse signal when said microcomputer means operates normally and for outputting a predetermined constant level signal when said microcomputer means misoperates;
first means, operatively associated with said output port and responsive to said microcomputer means misoperation, for producing and applying at predetermined intervals initializing and restarting signals to said reset terminal of said microcomputer to thereby effect initialization and restart of said microcomputer means; and second means, operatively associated with said output port and responsive to said microcomputer means misoperation, for producing and applying a fixed level disabling signal to said reset terminal of said microcomputer means to thereby hold said microcomputer in a disabled state whenever the duration of said misoperation exceeds a preset time period without successful restart of said microcomputer means, whereby the erroneous control of said vehicle is avoided.

* * * * *